Sept. 25, 1923.

W. A. CONTANT

INSPECTION TABLE

Filed Dec. 28, 1922

1,468,803

INVENTOR.
William A. Contant
BY Davis & Simms
his ATTORNEYS.

Patented Sept. 25, 1923.

1,468,803

UNITED STATES PATENT OFFICE.

WILLIAM A. CONTANT, OF ROCHESTER, NEW YORK, ASSIGNOR TO F. B. PEASE COMPANY, OF ROCHESTER, NEW YORK, A CORPORATION OF NEW YORK.

INSPECTION TABLE.

Application filed December 28, 1922. Serial No. 609,487.

*To all whom it may concern:*

Be it known that I, WILLIAM A. CONTANT, a citizen of the United States, and resident of Rochester, in the county of Monroe and State of New York, have invented certain new and useful Improvements in Inspection Tables, of which the following is a specification.

The present invention relates to inspection tables and more particularly to the type designed for the inspection of fruits, vegetables and other articles which are placed in a collection for the purpose of removing from the collection certain of the articles because of imperfections or other reasons, an object of this invention being to provide an inspection table in which the articles are caused to move while being inspected and, at the same time, are given a turning movement on the table. Another object of the invention is to provide an inspection table in which a slatted endless moving conveyor is combined with a flexible sheet in such a manner that the articles to be inspected, while resting upon the sheet, are caused to move and turn on such sheet.

To these and other ends, the invention consists of certain parts and combinations of parts, all of which will be hereinafter described; the novel features being pointed out in the appended claims.

Figure 1:
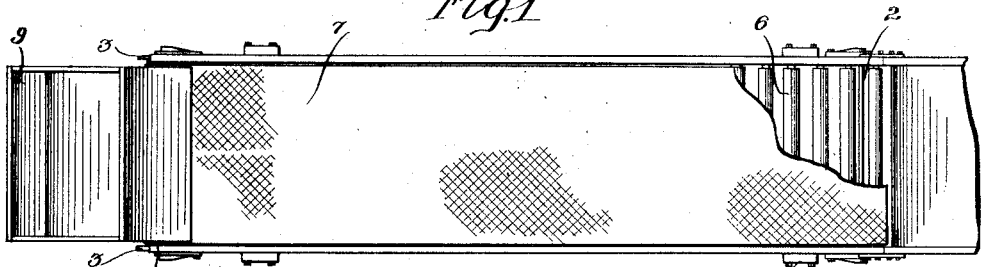
Fig. 1 is a plan view of an inspection table constructed in accordance with this invention.
Figure 2:
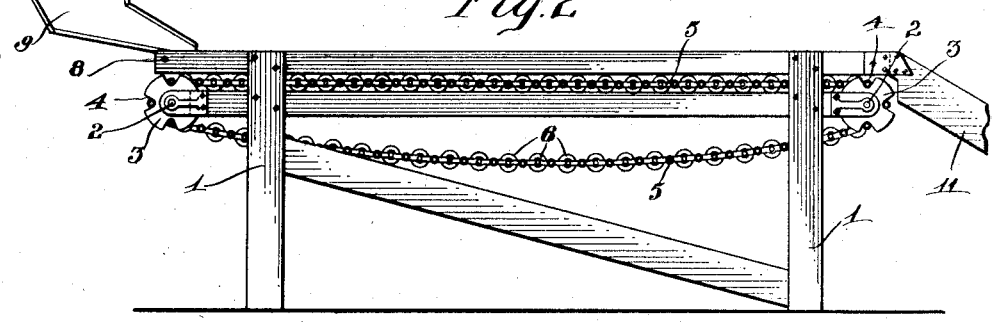
Fig. 2 is a side view of the table.
Figure 3:
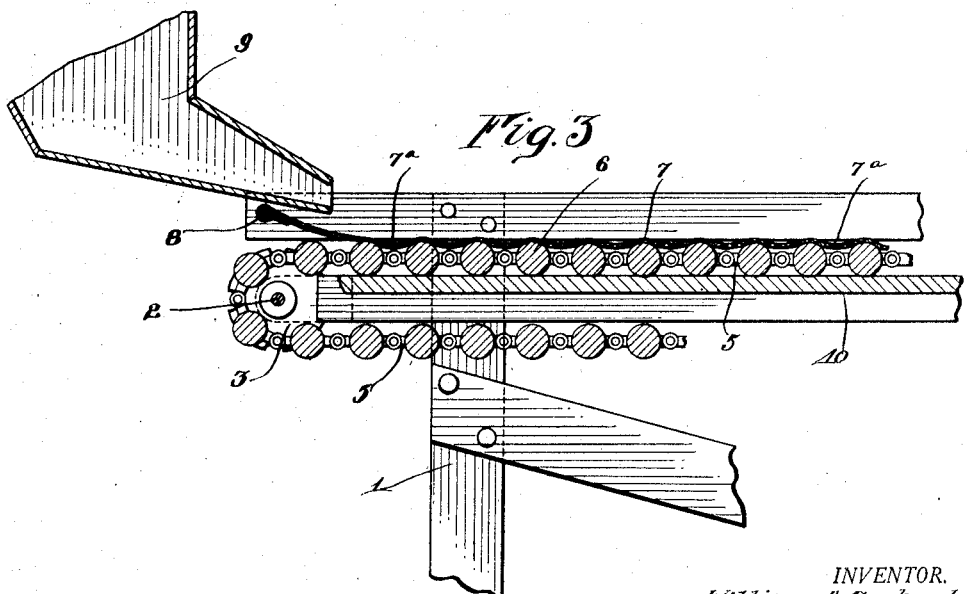
Fig. 3 is an enlarged fragmentary section.

Referring more particularly to the drawings, 1 indicates a main frame on which two shafts 2 are arranged, these shafts having thereon two sprocket wheels 3 in which projections 4 on sprocket chains 5 engage, these sprocket chains 5 being connected by bars or rollers 6 spaced apart and providing with the sprocket chains an endless conveyor. Lying over and in contact with the rollers or bars 6 is a flexible sheet 7 which is preferably secured to a bar 8 at one end, so that such sheet is held against movement with the conveyor. The articles to be inspected are delivered by a hopper 9 on to the sheet 7 near its secured end 8 and cause said sheet to form depressions between the rollers or channels $7^a$ in which the articles lie. As the rollers 6 move with the conveyor under the sheet, they are caused to rotate by the bed plate 10 and this rotation together with the movement of the conveyor relatively to the sheet 7 tends to carry the articles toward the discharge end 11 of the inspection table, while, at the same time, rotating said articles so that all sides thereof are presented upwardly for inspection before the discharge end of the inspection table is reached.

From the foregoing it will be seen that there has been provided an inspection table for articles of any suitable kind in which said articles are caused to travel and to rotate while travelling so that all portions of the articles are presented upwardly for inspection. This result is secured by the provision of an endless moving conveyor preferably having transverse bars in the form of rotating rollers combined with a flexible sheet lying in contact with said bars and secured against movement with the conveyor.

What I claim as my invention and desire to secure by Letters Patent is:

1. An inspection table comprising an endless moving conveyor having bars, and a flexible sheet having a width substantially equal to the length of the bars, resting on said conveyor and held against movement therewith.

2. An inspection table comprising an endless conveyor having bars in the form of rollers, means for rotating said rollers, and a flexible sheet having a width substantially equal to the length of the bars, resting upon said rollers and secured against movement with the conveyor.

WILLIAM A. CONTANT.